March 12, 1963 M. A. GARBELL 3,080,937
COMBINED ACOUSTIC WALL AND EXHAUST GAS DEFLECTOR
IN OPERATION OF JET ENGINES
Filed Nov. 7, 1960 2 Sheets-Sheet 2
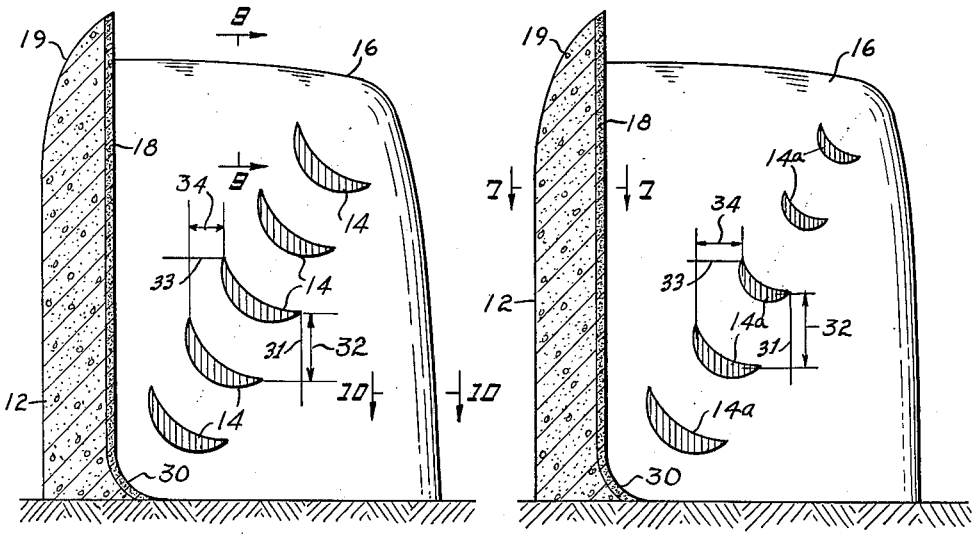
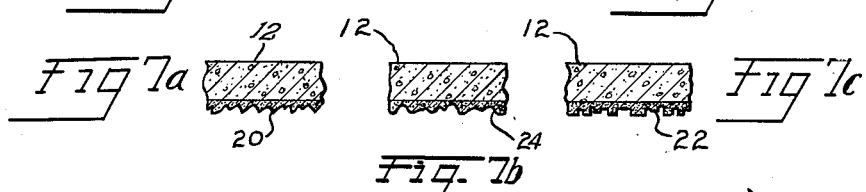
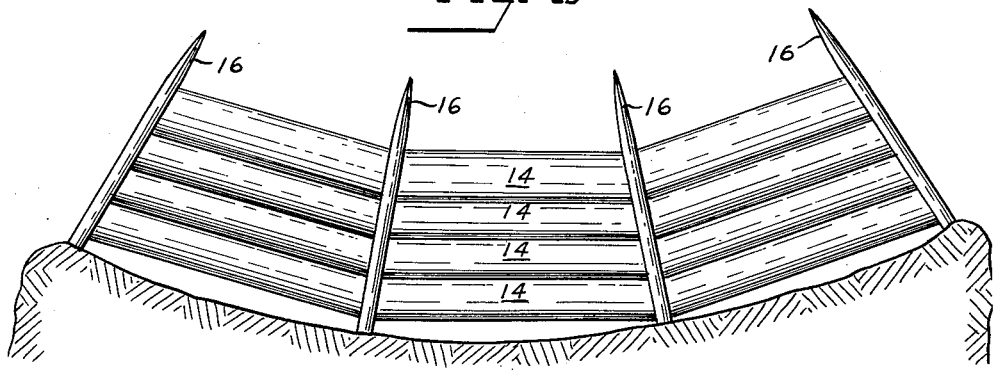
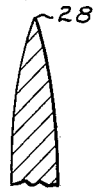
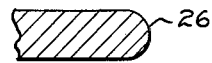
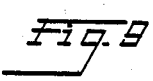
INVENTOR
MAURICE A. GARBELL
BY Scrivener & Parker
ATTORNEYS

United States Patent Office 3,080,937
Patented Mar. 12, 1963

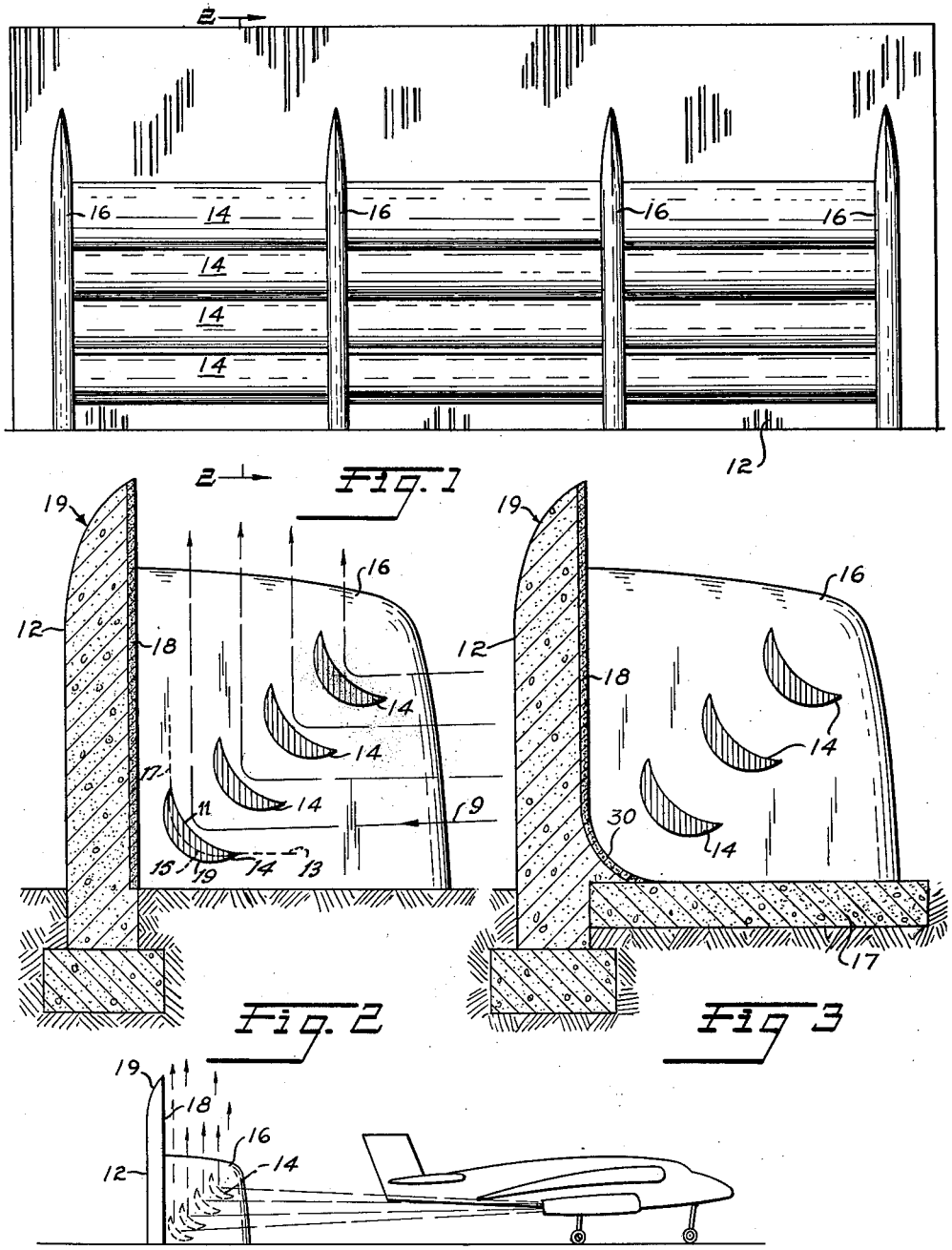

3,080,937
COMBINED ACOUSTIC WALL AND EXHAUST GAS DEFLECTOR IN OPERATION OF JET ENGINES
Maurice A. Garbell, San Francisco, Calif., assignor of one-half to Garbell Research Foundation, a non-profit corporation of California and of one-half to Maurice A. Garbell, Inc., a corporation of California, both of San Francisco, Calif.
Filed Nov. 7, 1960, Ser. No. 67,590
11 Claims. (Cl. 181—33)

This invention relates to apparatus for deflecting the exhaust gases from jet engines and other jet-exhaust or rocket-type devices and for effectively reducing and deadening the noise created by such exhaust gases in areas located on the ground aft of a jet aircraft.

The utilization of jet engines in aircraft has created a particular problem at and near airports due to the high-velocity exhaust gases produced thereby which are hot and smoky and produce irritating objectionable high-pitched shrieking noises as well as a loud low-pitched roar in areas located within approximately one-half mile aft of a jet aircraft during periods when the engines are being accelerated to high-thrust power settings prior to take-off. While many attempts have heretofore been made to provide various types of blast fences for generally deflecting and diffusing such exhaust gases upwardly into the upper atmosphere, none of such attempts has been effective to solve the problem.

It is accordingly one of the objects of the present invention to provide an apparatus which not only effectively deflects the exhaust gases in a substantially upwardly directed vertical jet sheet but also materially reduces the noise caused by such gases in areas on the ground located aft of the jet aircraft and the apparatus.

Another object of the invention resides in the provision of a novel combined acoustic-wall and deflector construction, the elements of which mutually cooperate to reduce noise and deflect the exhaust gases in a highly efficient aerodynamic manner.

A further object is to provide a novel structure of the above character which is effective in smoothly deflecting the exhaust gases upwardly with a velocity sufficient to propel such gases to a relatively high altitude to the end that ground level pollution of the atmosphere will be greatly minimized.

A still further object resides in the provision of a novel deflector blade construction in combination with a series of spaced-apart diaphragm plates or baffles which not only support the deflector blades but also prevent lateral horizontal dispersion and flow of the exhaust gases.

The above and other objects and novel features of the invention will appear more fully hereinafter from a consideration of the following detailed description when taken in connection with the accompanying drawings. It is expressly understood, however, that the drawings are utilized for purposes of illustration only and are not to be taken as a definition of the limits of the invention, reference being had for this purpose to the appended claims.

Referring to the drawings wherein similar reference characters refer to similar parts throughout the several views:

FIG. 1 is a front view of a combined acoustic wall and jet-engine exhaust-gas deflector constructed in accordance with the principles of the present invention;

FIG. 2 is a transverse sectional view of the apparatus of FIG. 1 and taken substantially along line 2—2 of the latter;

FIG. 3 is a sectional view similar to FIG. 2 but illustrating a modified form of the invention;

FIG. 4 is a diagrammatic view, on a reduced scale of the apparatus of the invention illustrating its use and association with an aircraft equipped with jet engines;

FIGS. 5 and 6 are sectional views of further modified forms of the invention;

FIGS. 7a, 7b and 7c are a series of three sectional views taken along line 7—7 of FIG. 6 and illustrating different modifications of the front face of the acoustic wall;

FIG. 8 is a front view similar to FIG. 1 but illustrating a modified arrangement of the exhaust-gas deflectors;

FIG. 9 is a fragmentary section of the upper edge portion of one of the diaphragm plates taken substantially along line 9—9 of FIG. 5 and being drawn at a scale substantially twice as large as that of FIG. 5; and FIG. 10 is a fragmentary section of the frontal edge of the diaphragm plate of FIG. 5 taken substantially along line 10—10 of the latter and being drawn at a scale substantially twice as large as that of FIG. 5.

Referring more particularly to FIGS. 1 and 2, the present invention is illustrated therein as comprising a ground-supported essentially vertical acoustic wall 12, a series of horizontally disposed metallic deflecting vanes 14, and a plurality of vertically disposed diaphragm plates 16, the latter being laterally spaced apart as indicated in FIG. 1. As illustrated in FIGS. 2 and 4 the vanes 14 are arranged in parallel staggered relationship with an angle of stagger of approximately 45°, the vanes being of concave-convex shape with the concave face 11 placed upwardly and toward the aircraft, and with the leading-edge tangent 13 to the airfoil mean line 15 of each vane 14 being substantially horizontal, and the trailing-edge tangent 17 to the airfoil mean line 15 of each vane 14 being substantially vertical, wherein the term "airfoil mean line," as is customary in the art, designates a curve located midway between the profile line of the concave face 11 and the profile line of the convex face 19 of any given vane 14. With such an arrangement the jet-engine exhaust gases directed toward the vanes 14 in a substantially horizontal direction 9, as seen in FIGS. 2 and 4, are effectively and smoothly deflected upwardly in a substantially vertical sheet of jet exhaust gases.

The ground-supported acoustic wall 12 is preferably constructed of concrete or concrete blocks and is provided with a front surface 18 of firmly compacted concrete or stucco in order to deaden the noise of the exhaust blast and to minimize the penetration into the wall of sound waves. The inner core of the wall may be filled with sound-deadening material, such as pumice, in order to reduce sound transmission through the wall. The front surface 18 may be shaped or striated in an irregular pattern as indicated at 20, 22 or 24 in FIGS. 7a, 7b and 7c. Such shaping of the front surface has the effect of back-scattering the sound in a plurality of directions and because of the differences in length of the acoustical paths of the sound waves, a considerable reduction in the sound-pressure levels prevailing on the aircraft side of the wall 12 will be achieved by the well-known cancellation phenomena due to wave interference.

The upper portion of the ground-supported acoustic wall 12 is preferably tapered as shown in cross section in FIGS. 2, 3, 4, 5 and 6, with the front face 18 remaining essentially vertical and the rear face 19 curving toward the front face 19, so that the air entrained by the vertical jet sheet, as well as the vertical jet sheet itself, will flow smoothly in an upwardly direction, without the formation of eddies that would be formed if the top of the wall had a bluff shape.

While any suitable framework may be utilized for supporting the deflecting vanes 14 in the positions shown in FIGS. 1, 2, and 4, it is preferred to utilize the diaphragm plates 16. As shown, such plates or fins are ground supported at their lower edges, and their rear edges may be embedded in the wall 16 in order to provide a rigid and highly damped structural support for the vanes 14. The plates 16 are suitably spaced horizontally apart, as for example, 10 or 12 feet, and the vanes 14 are secured thereto in any suitable manner, as by means of bolts or by extending into or through suitably shaped openings in the side walls of the plates. The vertical forward or leading edges 26 of the plates 16 are preferably rounded, see FIG. 10, in order to produce an aerodynamically smooth inflow of the exhaust gases, and the upper or trailing edges 28 are preferably tapered in order to produce an aerodynamically smooth outflow of such gases. It will be understood that, in addition to providing a rigid supporting structure for the deflecting vanes 14, the diaphragm plates 16 prevent any transverse horizontal outflow and diffusion of the exhaust gases spanwise of the vanes. Plates 16 also provide a rib strengthening structure for the wall 12 in order to buttress the wall not only with respect to any overturning moments and stresses imposed upon it by the jet-exhaust gases, but also relative to strong natural wind.

The modification shown in FIG. 3 is similar to that shown in FIG. 2 except that the front face 18 of the wall 12 is extended at its lower part to provide a rounded base portion 30 which extends throughout the length of the wall and is curved in a manner similar to the vanes 14. FIG. 3 also shows a footing slab 17 which serves as a footing for diaphragm plate 16 and as a paving surface for the ground, to resist the scouring action of the jet upon the ground.

In FIGS. 5 and 6 the family of blades 14 and 14a respectively are arranged at an angle of stagger steeper than 45°, as in FIGS 2 and 3, so that the inlets 32 of the spaces between the blades are larger in cross-sectional area as measured in a vertical plane 31 than the outlets 34 as measured in a horizontal plane 33. Since the same mass of gases per unit of time must pass through the outlet 34 as through the inlet 32, the velocity and hence the momentum of the gases is greater at 34 than at 32. With such an arrangement therefor the exhausting jet sheet of gases would be projected more vigorously upwardly to attain higher elevations in the atmosphere in order to minimize pollution of the atmosphere surface layer. It will be noted that in FIG. 6, the vanes 14a are shown as being progressively smaller in size from the lowermost to the uppermost vane.

In the forms of the invention heretofore described, the vanes are horizontally disposed. FIG. 11 illustrates a modification wherein the respective major planes of the diaphragm plates 16 converge upwardly in order to effect a vertical convergence of the deflected jet sheet of gases for the purpose of further minimizing diffusion of the combustion gases at low elevation. For purposes of simplification of illustration, the acoustic wall 12 has been omitted from FIG. 8.

It will be understood from the foregoing that the acoustic wall 12 is positioned transversely with respect to the fore and aft centerline of the aircraft, see FIG. 4, and that the structure of the invention is of sufficient vertical height to intercept and deflect vertically upwardly the exhaust gases issuing from the jet engines of the aircraft. The combination of the wall 12, the deflecting vanes 14, and the diaphragm plates 16, constructed and arranged as above described, produces a highly effective and aerodynamically efficient arrangement not only for deflecting the jet-engine exhaust gases upwardly to a substantially high elevation to greatly minimize air pollution at ground levels, but also to deaden the noise caused by such gases aft of the jet aircraft and the apparatus.

While several modifications of the invention have been shown and described herein with considerable particularity, it will be understood that the invention is not limited thereto but is capable of a wide variety of expressions. Reference will therefore be had to the appended claims for a definition of the limits of the invention.

What is claimed is:
1. Apparatus for use in the open for reducing noise created by jet-engine exhaust gases and for deflecting said gases upwardly in a generally vertical direction, comprising a vertically positioned ground-supported acoustic wall extending transversely of the direction of flow of said gases, a plurality of vertically positioned horizontally spaced diaphragm plates connected to said wall and extending toward the source of said gases, said plates being parallel with each other, and a plurality of spaced, parallel concave-convex metallic vanes of substantially airfoil cross-section supported by and extending between said plates for deflecting said exhaust gases in a vertical and upwardly extending direction, said vanes being arranged on an angle of stagger with respect to the ground and directed toward said source, each of said vanes being arranged with the concave sides placed upwardly and toward the source and with the tangents to the airfoil mean lines positioned substantially horizontally at the leading edges and substantially vertically at the trailing edges and each of said diaphragm plates forming a substantially continuous vertical surface extending from said acoustic wall and from the ground to the vane located at the greatest height above the ground and farthest from said acoustic wall and nearest to said source, each of said diaphragm plates embracing each of said vanes along both the concave and the convex sides of said vanes, thereby forming a substantially continuous vertical surface extending between and connecting any two and all of said vanes.

2. Apparatus as set forth in claim 1 wherein the vertically measured cross-sectional area between adjacent vanes at the leading edges thereof is greater than the horizontally measured cross-sectional area at the trailing edges thereof.

3. Apparatus as defined in claim 1 wherein said vanes are progressively reduced in size from the lowermost vane to the uppermost vane.

4. Apparatus as defined in claim 1 wherein the front face of said acoustic wall is provided with a concave foot extending throughout the length of the wall, the curvature of said foot being similar to the curvature of the concave sides of said vanes.

5. Apparatus as defined in claim 1 wherein the front edge of each of said diaphragm plates is rounded and the upper edge is tapered.

6. Apparatus as defined in claim 1 wherein the thickness of said acoustic wall is greatest at the bottom of the wall and smallest at the top of the wall.

7. Apparatus for use in the open for deflecting jet-engine exhaust gases upwardly into the atmosphere, comprising a plurality of horizontally positioned, spaced-apart, and parallel concave-convex vanes of substantially airfoil cross section, means for supporting said vanes on an angle of stagger with respect to the ground and directed toward the source of said gases, each of said vanes being arranged with the concave sides placed upwardly and toward the source and with the tangents to the airfoil mean lines positioned substantially horizontally at the leading edges and substantially vertically at the trailing edges, and a ground-supported substantially planar vertical sound deadening wall extending transversely with respect to the direction of flow of said gases and parallel to said vanes, said wall being positioned in the free atmosphere near the vane located lowest in height and farthest in horizontal distance from the source of said gases and extending vertically upwardly to a higher elevation than the vane located uppermost and nearest the source of said gases and being connected to said supporting means.

8. Apparatus as set forth in claim 7 wherein the vertically measured cross-sectional area between adjacent vanes at the leading edges thereof is greater than the horizontally measured cross-sectional area at the trailing edges thereof.

9. Apparatus as defined in claim 7 wherein said vanes are progressively reduced in size from the lowermost vane to the uppermost vane.

10. Apparatus as defined in claim 7 wherein the front face of said wall is provided with a concave foot extending throughout the length of the wall, the curvature of said foot being similar to the curvature of the concave sides of said vanes.

11. Apparatus as defined in claim 7 wherein the thickness of said wall is greatest at the bottom of the wall and smallest at the top of the wall.

References Cited in the file of this patent

UNITED STATES PATENTS

| | | |
|---|---|---|
| 1,581,795 | Delaney | Apr. 20, 1926 |
| 1,875,074 | Mason | Aug. 30, 1932 |
| 1,925,139 | Fellers | Sept. 5, 1933 |
| 2,685,936 | Brenneman et al. | Aug. 10, 1954 |
| 2,936,040 | Rennard | May 10, 1960 |
| 2,974,910 | Lynn | Mar. 14, 1961 |